(12) United States Patent
Shu et al.

(10) Patent No.: US 8,121,897 B2
(45) Date of Patent: Feb. 21, 2012

(54) SYSTEM AND METHOD OF ADVERTISEMENT VIA MOBILE TERMINAL

(75) Inventors: Ren Chen Shu, Keelung (TW); Kuo-Ching Chiang, New Taipei (TW)

(73) Assignee: Kuo-Ching Chiang, Linkou District, New Taipei (TW)

(*) Notice: Subject to any disclaimer, the term of this patent is extended or adjusted under 35 U.S.C. 154(b) by 1367 days.

(21) Appl. No.: 11/700,138

(22) Filed: Jan. 31, 2007

(65) Prior Publication Data
US 2007/0226061 A1     Sep. 27, 2007

Related U.S. Application Data

(63) Continuation-in-part of application No. 09/731,564, filed on Dec. 6, 2000, now abandoned.

(51) Int. Cl.
G06Q 30/00 (2006.01)
H04M 1/64 (2006.01)
H04M 13/00 (2006.01)

(52) U.S. Cl. ........ 705/14.5; 705/14.64; 379/79; 379/82; 379/179; 379/185

(58) Field of Classification Search .............. 705/14.49, 705/14.5, 14.64; 379/79, 82, 179, 185
See application file for complete search history.

(56) References Cited

U.S. PATENT DOCUMENTS

| | | | |
|---|---|---|---|
| 7,379,760 B2* | 5/2008 | Ishii | 455/567 |
| 2003/0110081 A1* | 6/2003 | Tosaki et al. | 705/14 |
| 2007/0226061 A1* | 9/2007 | Chen et al. | 705/14 |
| 2008/0152097 A1* | 6/2008 | Kent | 379/93.01 |

OTHER PUBLICATIONS

Pendleton, Scott, "Who Called and Hung Up? Caller ID Service Will Tell You", Christian Science Monitor, Friday, May 27, 1994, p. 9.*

* cited by examiner

*Primary Examiner* — Donald Champagne
(74) *Attorney, Agent, or Firm* — Chih Feng Yeh; Huntington IP Cousulting Co., Ltd.

(57) ABSTRACT

The present invention provides a method for delivering an advertisement to a user comprising providing an advertisement by the advertiser to the service system, followed by delivering the advertisement by the service system to a mobile phone of a user through mobile phone communication network. The user determines to browse the advertisement or not. The user watches and brows the advertisement via the display of the mobile phone.

7 Claims, 6 Drawing Sheets

SYSTEM AND METHOD OF ADVERTISEMENT VIA MOBILE TERMINAL

The application is continue in part application of U.S. application Ser. No. 09/731,564, filed on Dec. 6, 2000 now abandoned.

FIELD OF THE INVENTION

The present invention relates to a system and method for automatically deliver an advertisement to a target, and more specifically, to deliver an advertisement to a mobile phone via a communication network.

BACKGROUND OF THE INVENTION

The conventional commerce offers limited practical advantages to their client. The business method is slow, time-intensive, and expensive to initiate and maintain. The network is now a world wide information highway connecting most of the computer system the entire world. The user can interconnect with the network using various services such as electronic mail and World Wide Web (WWW). E-mail is one of the popular use tools, it is possible for computer system linked to internet for communicating each other. The World Wide Web ("WWW") was designed as an easy visual interface for representatives of the internet. There have been proposed prior systems and methods of arranging the advertisement over the Internet between advertisers and media owners. The methods offer to the advertisers to buy ad space of the media owners on a pay-per-action basis. The advertisers and the media owners are looking for the measure for effectiveness of the campaign over the Internet which is not simply relying upon the cost-per-click or cost-per-action. The new advertising medium provided by the network has a number of significant advantages for advertisers. In general, the advertising can, in some instances, be targeted in various ways, such as demographically or reactively. An example of the latter of these is in push technology where the user requests certain types of information and this request is used to select the type of advertisement sent to the user along with the requested content. The advertising can not only include audio and video elements as well as simple visual elements, but can also be interactive. For example, by clicking on the advertisement, the user can be provided with additional information about the advertised products or services and can even be given the opportunity to purchase the products or services electronically.

However, the advertisement is processed within the Internet domain, only. The method constrains the location and time to receive the information.

In view of the above potential demands of the advertisers, the inventors have sought to provide an advance method for the advertisement between the advertisers and the user.

SUMMARY

The present invention provides a method for deliver an advertisement to a user comprising providing an advertisement by the advertiser to the service system, followed by delivering the advertisement by the service system to a mobile phone of a user through mobile phone communication network; and determining to browse the advertisement or not by the user. The user watches and brows the advertisement via the display of the mobile phone.

The method for deliver an advertisement to a user comprises providing an advertisement by the advertiser to the service system, followed by detecting a dialing signal from a dialing call user by the service system. Then, the system transmits an advertisement to a phone of the dialing call user before an answer party answers the call, wherein the dialing party may receive an advertisement send by the service system while waiting call answer. Next, the user may brows the advertisement through the display of the mobile phone of the user, and the advertisement will be terminated after the answer party answers the phone. Similarly, the user may get feed back rewards for browsing the advertisement from the service system or the advertiser. The advertisement is displayed on a display of the phone. The phone could be the mobile phone, PSTN phone or internet phone.

Based on the method of the present invention, the advertisement may be delivered to the mobile phone of the user, the advertiser may transmit the information without time and space limitation. In the conventional method, the user has to power on the computer and input the condition to receive the desired advertisement. The method is passive, and the user will not go out with the computer everyday. Thus, the conventional method is constrained by these limitations. The mobile phone is the device that will be carried by the user everyday. Apparently, the present invention may improve the advertisement efficiency and effects.

DETAILED DESCRIPTION

The invention will now be described in greater detail with preferred embodiments of the invention and illustrations attached. Nevertheless, it should be recognized that the preferred embodiments of the invention is only for illustrating. Besides the preferred embodiment mentioned here, present invention can be practiced in a wide range of other embodiments besides those explicitly described, and the scope of the present invention is expressly not limited expect as specified in the accompanying Claims.

Referenced throughout the specification to "one embodiment" or "an embodiment" means that a particular feature, structure, or characteristic described in connection with the embodiment and included in at least one embodiment of the present invention. Thus, the appearances of the phrase "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
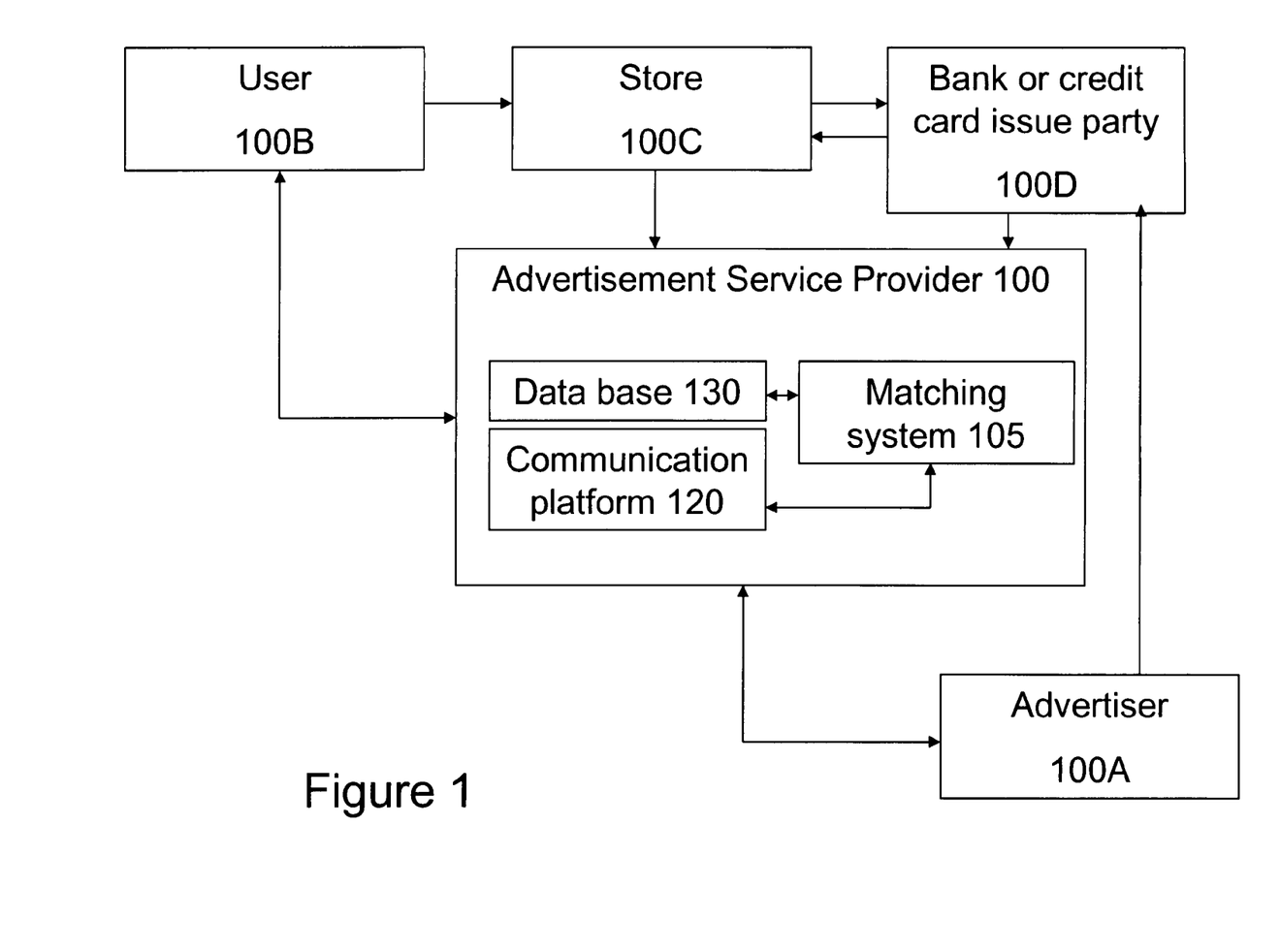
FIG. 1 is a diagram of the system according to the present invention.

The present invention discloses a system and method for an advertiser to target the potential client from public for improving the efficiency of advertisement via mobile phone communication network or internet network. The present also provides a matching method based thereon. With reference to FIG. 1, there is illustrated a block diagram of the architecture of the advertisement targeting system or service provider 100 according to the present invention. The system serves as a central control system to send information to the advertiser or the consumer. The advertiser may successfully deliver the advertisement material to the consumer or subscriber via the matching system of the present invention. The present invention may be implemented using a computer having display screen and a positional input device. FIG. 1 shows an advertisement targeting system 100, which may include a business management and financial management.

A service provider 100 may match the advertiser and the potential target consumer or subscriber. In preferred embodiment, the service provider 100 is mobile phone service corporation that provides the service of communication and linking network. A database 130 is coupled to the matching system 105 and the matching system manipulates the stored information. The database includes merchant database, the medium database and the targeting data (or information). The targeting information is input by the advertiser 100A or the subscriber (user or consumer) 100B. The advertiser 100A may set the key word to target the potential client or user.

In one case, the advertiser who wished to deliver the advertisement has to access a terminal including processing unit such as CPU. The terminal of the advertiser 100A may be a computer, PDA, mobile phone or the like. The terminal of the advertiser 100A is coupled to the advertisement targeting system 100 over the internet or mobile phone network through communication platform 120. Each advertiser 100A terminal includes one or more input/output devices that allow for the entry of target and the display of output. As known in the art, the advertiser terminal also includes a storage device such as memory coupled to the processing unit. The user or subscriber 100B also contains aforementioned apparatus to access the function of the present invention. In a preferred embodiment, the system 100 includes advertisement and/or medium database 130. The medium database 130 includes the information of the medium and/or the advertisement agent. The database also includes the merchant data, the information of the member and subscriber.

The system manages the information over the mobile phone communication links. The system also manipulates the database, and the system 105 addresses advertisements to specifically targeted subscribers or consumer based on a subscriber's personal profile stored in the database of the system. The system also manages the distribution queue of the advertisements. The system will arrange the advertisement queue based on the clicking rate of user, advertisement cost of the advertiser or keywords. The potential target information or target database preferably further includes subscriber data, advertiser data, advertisement data, subscriber statistics, advertiser statistics. The subscriber data preferably includes the subscriber's identification information, a password assigned to the subscriber, and a personal profile of the subscriber that may be used to target specific advertisements to the subscriber. The answer of the questionnaire is also used to target the potential user as well as the subscriber's personal profile. The advertiser data preferably includes identification information for each advertiser that provides advertisements to be distributed to the public. The service provider 100 may refresh the queue of the advertisements to be delivered based on the cost of the advertisement set by the advertiser, clicking rate of the user and so on. The financial management of the system calculates a reward or coupon offered by the advertiser or the system owner (mobile phone service provider) after the subscriber reads or browses the advertisement. Alternatively, the financial management or the system calculates a feed back reward to the subscriber 100B in accordance with a percentage of the benefit defined by the advertiser 100A. An alternative method may be used to define the benefit for the target and the advertisement matching system 105 of the service provider 100. For example, the advertisement system 100 may offset part of the debit note of the mobile phone communication fee.

Figure 2:
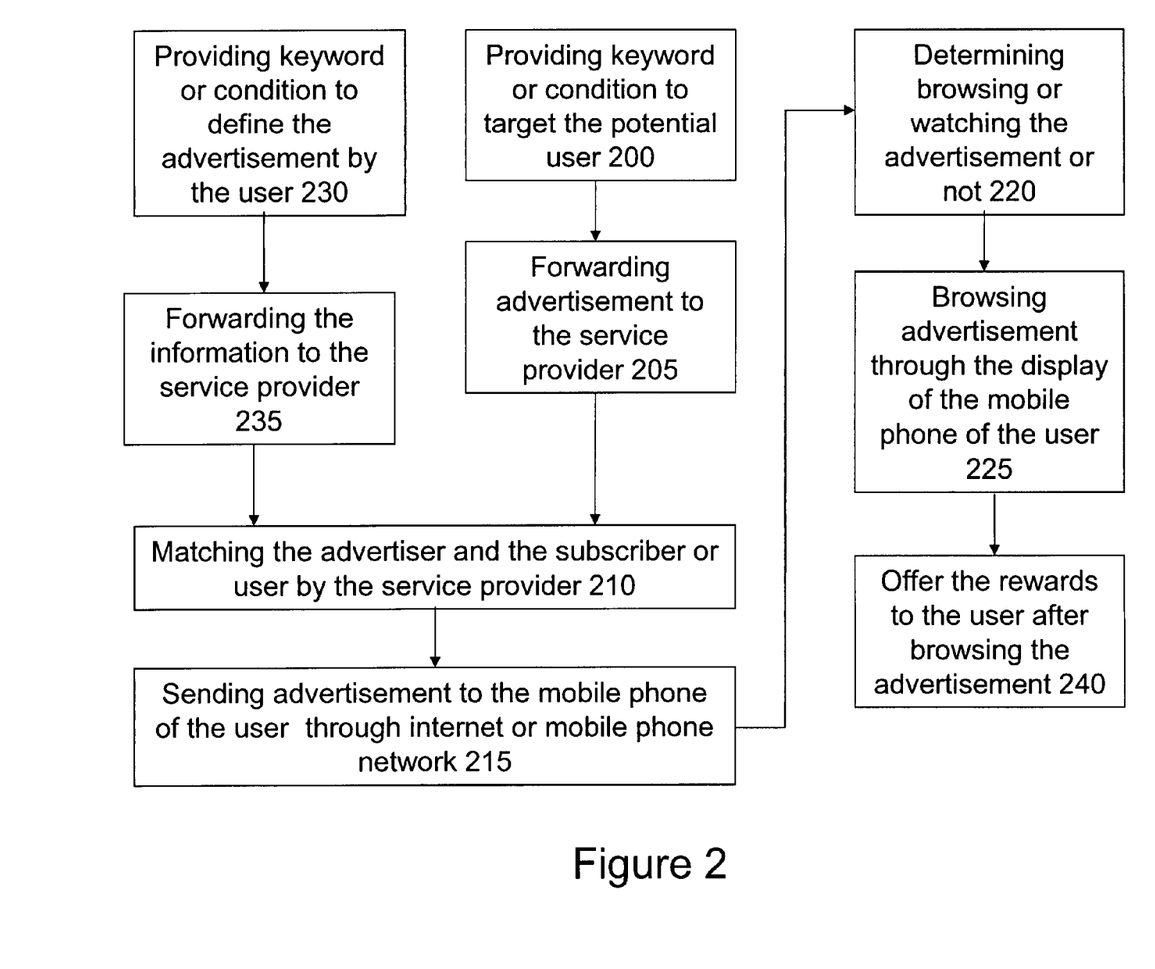
FIG. 2 is a flow chart diagram of a method according to the present invention.

FIG. 2 is a flow chart in accordance with the present invention. The advertiser may enter key word for targeting the potential client at steps 200 to the service or targeting system 100 by via internet network or mobile phone network. In the step, the advertiser may set the target, target condition and the advertisement budget or cost. Further, the advertiser may set the target condition to determine who will receive the delivered advertisement. Typically, it depends on the consumer's or subscriber's hobby, personal character, style, interesting, the searching key word provided by the user and something like that.

Then, the advertiser forwards the information to the system 100 of the present invention, step 205. The system 100 will record the information send from the advertiser and stores the information into the database. Optionally, the user 100B may provide the keyword or condition to define the advertisement. The subscriber or consumer is optionally send information to the system 100 and stored in the database.

The key word or targeting condition is entered at each terminal, which is electronically transmitted to the system 100 and stored as files in the database of the system 100. In the representative embodiment, after the information of the advertiser or subscriber is input to the system, the matching system 150 may determiner whether the updating information is match or not. A mutual satisfaction represents the potential for that satisfaction pair mutually to satisfy each other. The system 100 will forward the message to the advertiser 200. In another method, there is no any matching step, the system only transmits the advertisement to the user based on the information provided by the advertiser and other information.

At step 210, the advertiser then delivers the advertisement to the subscriber 300 via the system 150 using mobile phone network. The consumer or subscriber 200 may determine whether to browser the advertisement or not, 220. The subscriber 300 may confirm the message and browse the advertisement in step 225 within the display of the mobile phone terminal. The advertisement system therefore directly forwards the advertisement to the client via the mobile phone network.

It could be a video file and/or audio file. For example, it could be a 3G protocol call, a short message, or a voice message. Preferably, it forwards the advertisement to the client through a video/audio call through the mobile phone network. The user may receive the rewards offered by the system or the advertiser after the user browses the advertisement 240. The method allows the advertiser or the service provider deliver the advertisement directly and instantly without the computer, location and time limitation. In the conventional method, the advertisement system waits for the user linking to the system and input the query, followed by sending the information to the user based on the question. It depends on the user. The present invention converses the passive deliver way into active method to improve the efficiency and alter the advertisement behavior. It targets the potential user and transmits the advertisement to the portable communication device of the user directly. Before the 3G generation, it is unlikely to achieve the purpose. The present invention may obtain the objects based on the environment of 3G.

Alternatively, when the user would like to make a mobile phone to others, before the call is answered by the answer party, there is a waiting time before the answer party reaches the phone. If you make a 3G call, the advertisement may be delivered to the calling or dialing party within the time before the receiver picks up and answer the phone.

Therefore, the present invention provides a method for deliver an advertisement to a user comprising providing an advertisement by the advertiser to the service system, followed by delivering the advertisement by the service system to a mobile phone of a user through mobile phone communication network; and determining to browse the advertisement or not by the user. The user watches and brows the advertisement via the display of the mobile phone.

A first keyword or condition to target a potential user may be provided to the service system by the advertiser before delivering the advertisement. The first keyword or condition is used to indicate the business of the advertiser. The matching processed is performed to match the advertiser and the user based on the first keyword or condition.

Further, the user may set a second keyword or condition to define a desired advertisement to be received by the user, followed by sending the keyword or condition to the service system. The step for matching the advertiser and the user is based on the second keyword or condition. The second keyword or condition includes a personal profile of the potential user, personal hobby, personal character, style or interesting.

Figure 3:
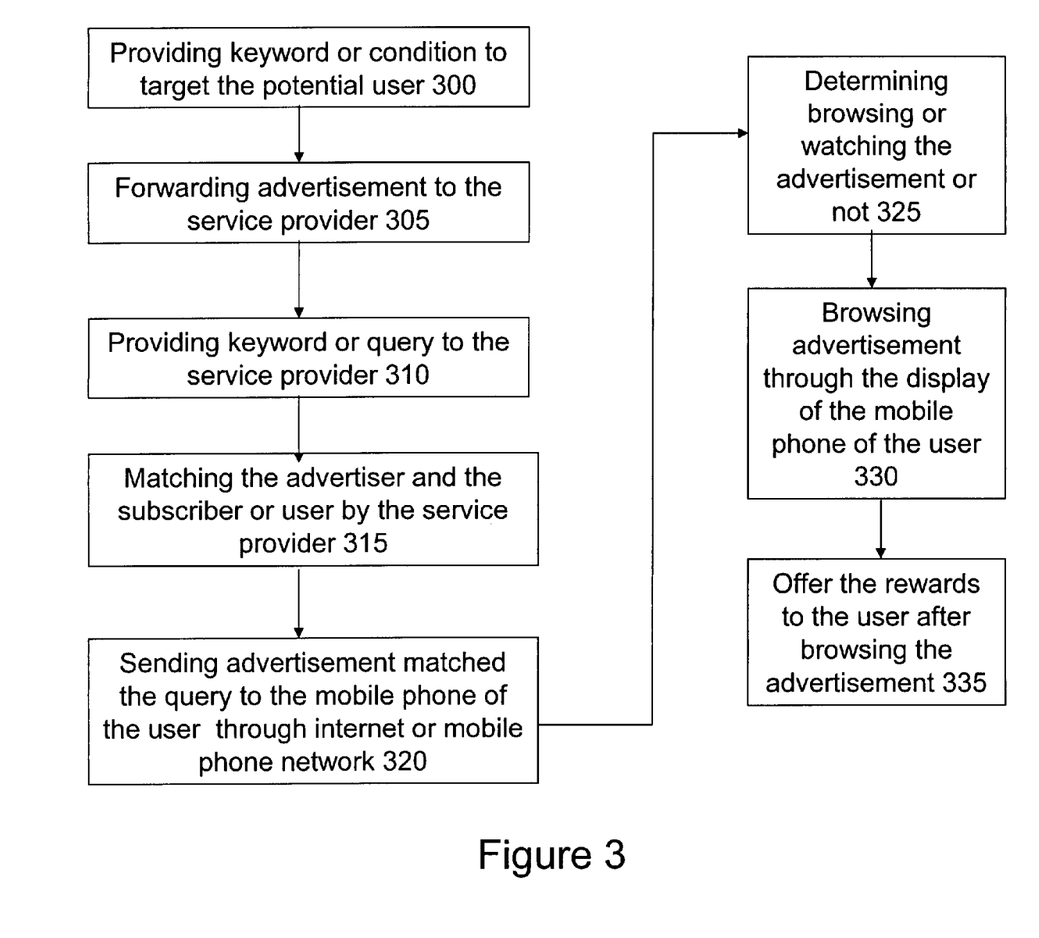
FIG. 3 is a flow chart diagram of a method according to the present invention.

Alternatively, the method for deliver an advertisement to a user comprises (refer to FIG. 3): a first keyword or condition to target a potential user to the service system is provided by an advertiser (300) and an advertisement is send by the advertiser to the service system (305). A second keyword or condition to define a desired advertisement to be received by the user is send or provided to the service system by the user, step 310. Then, a matching step is employed to match the advertiser and the user based on the first and second keywords or conditions (315). Thereafter, the advertisement is delivered by the service system to a mobile phone of a user through mobile phone communication network (320); and the user determines to browse the advertisement or not (325); and the advertisement is displayed and browsed via the display of the mobile phone.

Figure 4:
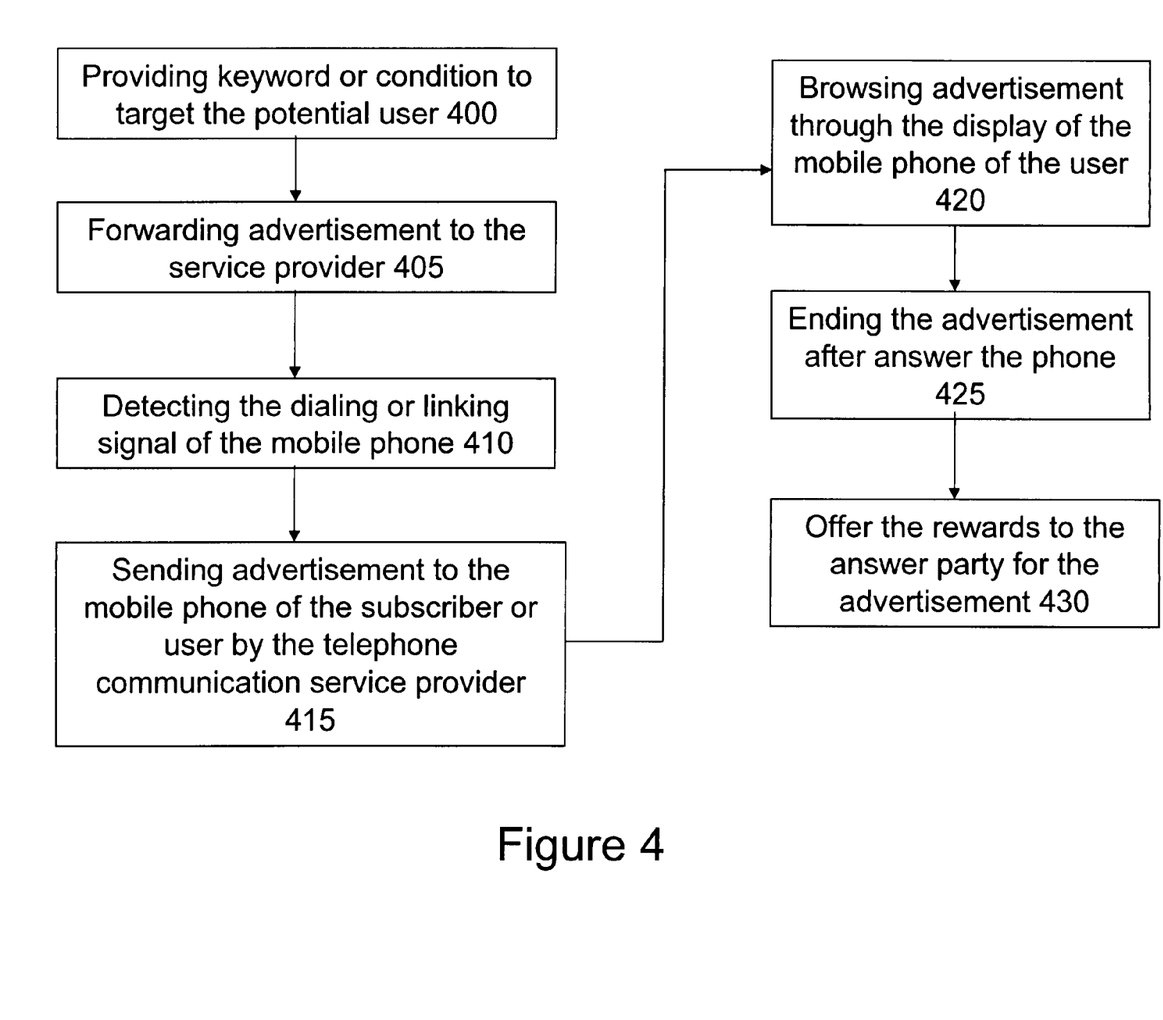
FIG. 4 is a flow chart diagram of a method according to the present invention.

FIG. 4 illustrate the flow chart for another embodiment of the present invention. The method for deliver an advertisement to a user comprising providing an advertisement by the advertiser to the service system (405), followed by detecting a calling or dialing signal from a calling party by the service system (410). Then, the system transmits an advertisement to a phone of the calling party before an answer party answers the call (415), wherein the calling or dialing party may receive an advertisement send by the service system while waiting the call answer. Next, the user may brows the advertisement through the display of the mobile phone of the user 420, and the advertisement will be terminated after the answer party answers the phone 425. Preferably, the advertisement having video/audio data is transmitted by 3G specification environment. Similarly, the user may get feed back rewards for browsing the advertisement from the service system or the advertiser 430. The advertisement is displayed on a display of the phone. The phone could be the mobile phone, PSTN phone or internet phone. Optionally, in step 400, the advertiser may provide the keyword or condition to target the potential user before delivering advertisement.

Alternatively, the transmitted material could be other video information designated by the answer party before the answer call party answers the call. The calling party may watch the default animation or motion picture before the answer party answers the phone. The method may provide customized style animation for the dialing party. Typically, the designated motion picture, video or motion picture is stored in the database of the telephone-service provider 100 or the memory of the user's mobile phone.

The service or matching system or the financial management may determine the service charge for delivering and matching the advertisement. The service system of the service provider or the financial management determine the feed back award for the subscriber according to the previous condition set by the advertiser or the service system of the provider.

One aspect of the present invention is that the present system or method may provide deliver advertisement by peer-to-peer and directly transmit the advertisement to the personal mobile phone, thereby increasing the efficiency of advertising. The merchant or the advertise agent may promote or advertise his product for developing his marketing through the mobile phone terminal. The individual or any company may determine what type of the advertisement to be received according to the present invention.

Figure 6:
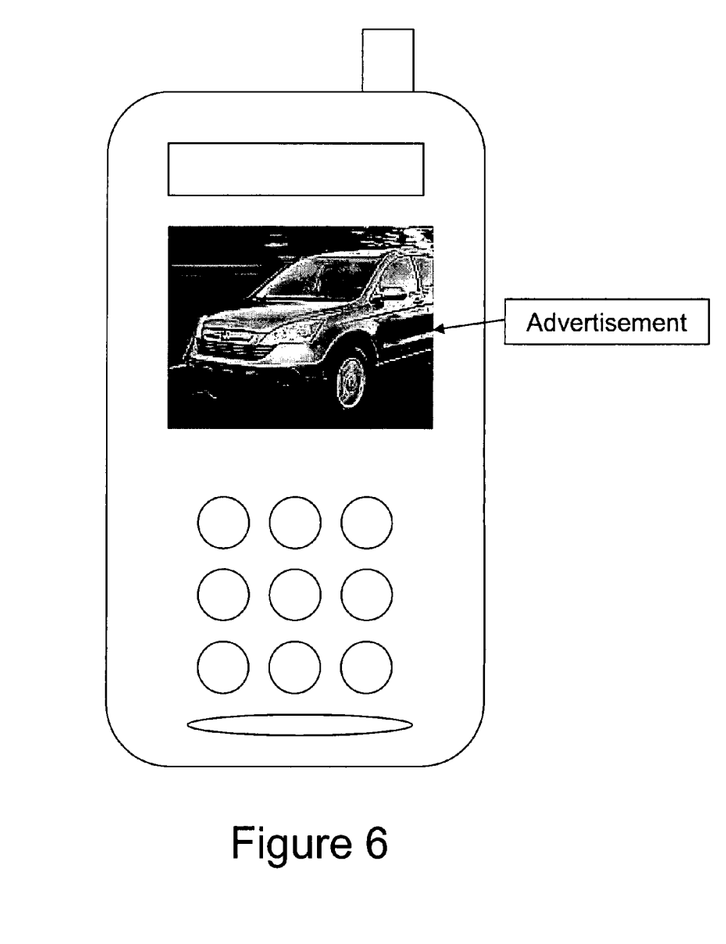
FIG. 6 is the example illustrating when the advertisement is delivered to user through the mobile phone.

The user or the advertiser may set the advertisement type to be received or delivered by the present invention. The system may provide the mode for the user or advertiser to set the reward or coupon. The user may subscribe what kind of the advertisement he would like to receive. The advertiser may set the target or condition and the advertisement budget. FIG. 6 is the example illustration when the advertisement is delivered to user through the mobile phone. The system actives the matching system to match the matching pairs, the matching system forwards the matching material to the.

Figure 5:
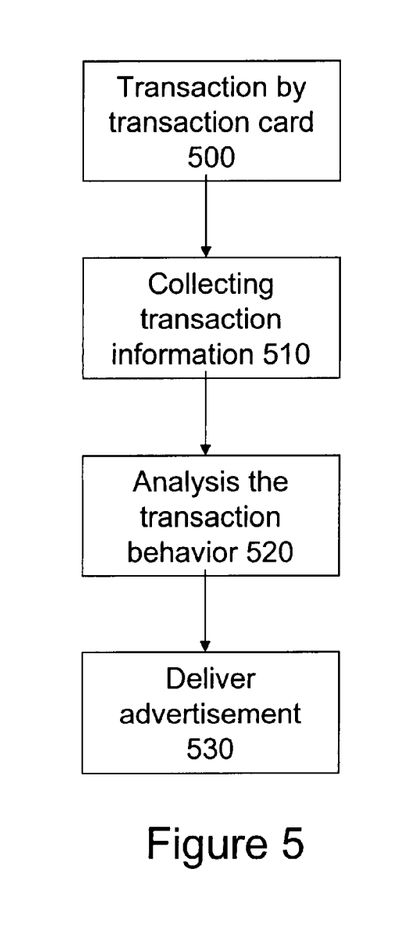
FIG. 5 is a flow chart diagram of a method according to the present invention.

Consumer: the user may offset telecommunication fee after watching the advertisement or receive coupon Advertiser: affords the advertisement fee Telephone-company (advertisement service provider): providing (selling) the advertisement service and get the service and communication fee Agent: Commission Please turn to FIG. 5, if the user may utilize the credit card or transaction card to transaction (the transaction card may be incorporated with the mobile phone) in step 500. Preferably, the transaction card is wireless contact card having a chip and antenna for transaction. Typically, the mobile phone includes identifying code to identify the user or subscriber. For GSM system, a SIM card is provided to perform such function. If the identifying code or the SIM is coupled to the chip of the wireless transaction card, the user may be identified. The user may also be identified through the transaction card identify code as well. When the user transacts with a store 100C by the credit card or transaction card in the mobile phone in step 500, the transaction request message will be transmitted to the credit card center, and approved by the center. The bank or the credit card issue party 100D may collect the transact information. The service provider 100 may be also collect the transaction information if they have the permission of the user 100C in step 510. Typically, the mobile phone includes identifying code to identify the user or subscriber. These parties 100D, 100 may analysis the transaction behavior of the user in step 520. Thereafter, the advertisement service provider 100 may send related advertisement to the user 100C according to the product the user purchases in step 530.

Figure 7:
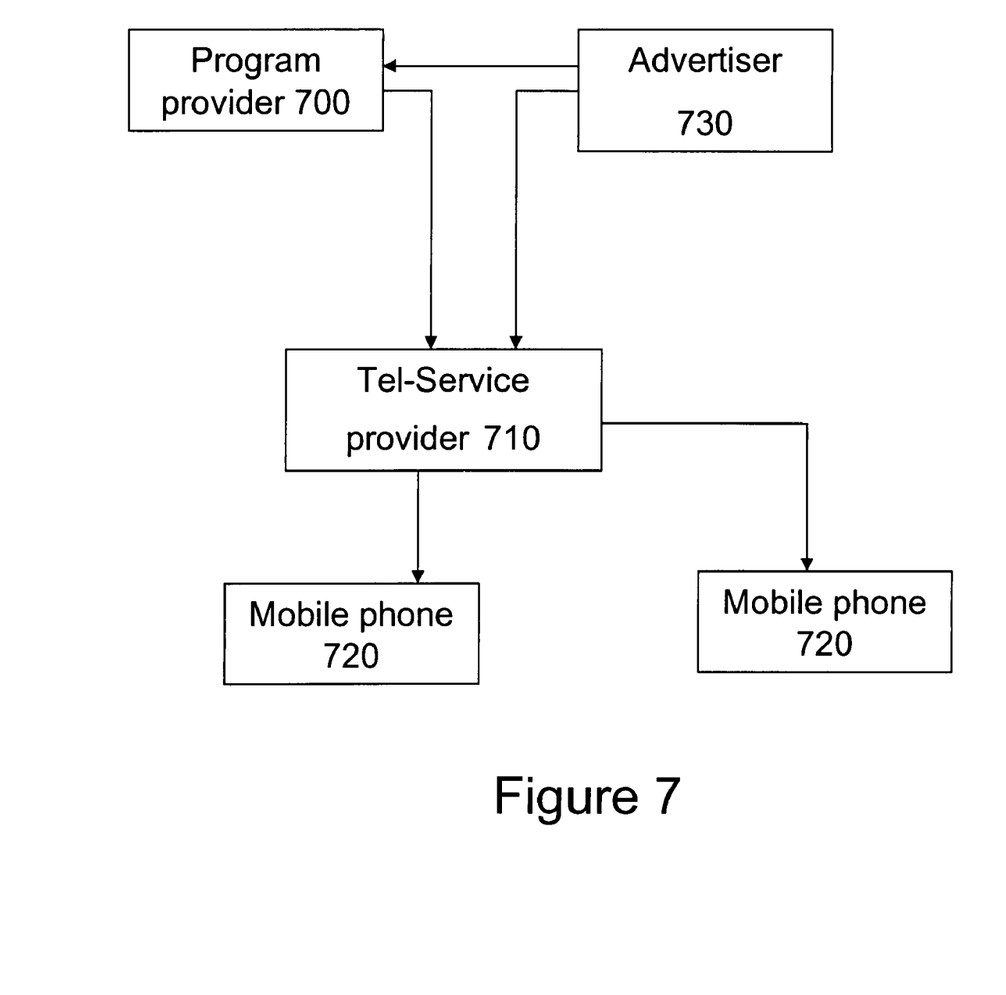
FIG. 7 is a diagram of the system according to the present invention.

Turning to FIG. 7, in the embodiment, the program provider 700 provides the program, for instance, mobile phone TV program, video, or show to the terminal such as the mobile phone 720 of the user. In one case, the mobile phone may be 3G or updated version, it could transmit and receive the 3G data through mobile phone network. In general, the tel-communication service provider 720 constructs the network for the mobile phone communication. The program provider 700 broadcasts the mobile phone TV program to the mobile phone 720 through the telecommunication service provider 720. The advertiser 730 provides the advertiser to the program provider 700 or the telecommunication service provider 720. The advertisement provided by the advertiser 730 will be incorporated within the program. The advertisement will be transmitted to the mobile phone 720 when the user watches the mobile TV program by the mobile phone. In one case, the advertiser sponsors the TV program, the user may or may be not pay the transmission fee to the service provider 720. The advertisement is transmitted under 3G specification or updated version environment.

The present invention may deliver the advertisement to the user directly and target to potential client thereby improving the promotion effect. The present offer the benefit or coupon to the user, it will increase the desire to watch or read the advertisement. The service provider and the advertiser may create more opportunity to increase their profit. Further, the advertiser may define or target the potential client and the cost as well. Thus, the present invention provides a method for deliver an advertisement to a user comprising: transmitting a TV program to a portable communication device through a communication service provider, the advertisement provided by an advertiser is deliver to the portable communication device during the portable communication device receives the TV program. The advertisement is provided to a program provider or the communication service provider having communication network for wireless wide area communication before transmitting to the portable communication device, wherein the portable communication device includes mobile phone, smart phone, PDA, GPS or MPEG player. The TV program is provided by the advertiser, the program provider or the communication service provider.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. Thus, while the preferred embodiment of the invention has been illustrated and described, it will be appreciated that various changes can be made therein without departing from the spirit and scope of the invention.

The invention claimed is:

1. A method for deliver an advertisement to a user comprising:

providing a browsable video advertisement by an advertiser to a service system or said browsable video advertisement being stored in said service system;

detecting a calling signal from a calling party;

transmitting said advertisement to a portable communication device of said calling party before an answer party answers said call, wherein said calling party may receive and browse said browsable video advertisement sent by said service system while waiting call answer.

2. The method of claim 1, wherein said browsable video advertisement is transmitted under 3G specification or updated version environment.

3. The method of claim 2, wherein said browsable video advertisement is displayed on a display of said portable communication device, and wherein said portable communication device includes mobile phone, PSTN phone or internet phone.

4. A method for deliver video information to a user comprising:

designating a browsable video by an answer party to a service system;

detecting a calling signal from a calling party who makes a call;

transmitting said browsable video to a portable communication device of said calling party before said answer party answers said call, wherein said calling party may receive and browse said browsable video sent by said service system while waiting call answer.

5. The method of claim 4, wherein said browsable video is displayed on a display of said phone portable communication device, and wherein said portable communication device includes mobile phone, PSTN phone or internet phone.

6. The method of claim 4, wherein said browsable video is stored in a database of said service provider or memory of a phone of said answer party.

7. A method for a service system providing video information to a user comprising:

designating a browsable video by an answer party to said service system said browsable video being stored in a database of said service system or a phone of said answer party;

detecting a dialing signal from a calling party who makes a call;

transmitting said browsable video to a portable communication device of said calling party before said answer party answers said call, wherein said calling party may receive and browse said browsable video sent by said service system while waiting call answer, wherein said browsable video is transmitted under 3G specification or updated version environment.

* * * * *